(12) United States Patent
Hilderband et al.

(10) Patent No.: US 8,815,170 B2
(45) Date of Patent: Aug. 26, 2014

(54) DEVICES AND METHODS OF HEAT REMOVAL FROM EXOTHERMIC HIGH TEMPERATURE REACTION PROCESSES

(75) Inventors: James Ronald Hilderband, Simpsonville, SC (US); Mark W. Dassel, Indianola, WA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 265 days.

(21) Appl. No.: 13/060,012

(22) PCT Filed: Aug. 17, 2009

(86) PCT No.: PCT/US2009/053987
§ 371 (c)(1),
(2), (4) Date: Jul. 7, 2011

(87) PCT Pub. No.: WO2010/021964
PCT Pub. Date: Feb. 25, 2010

(65) Prior Publication Data
US 2011/0256033 A1 Oct. 20, 2011

Related U.S. Application Data

(60) Provisional application No. 61/090,709, filed on Aug. 21, 2008.

(51) Int. Cl.
*F28D 21/00* (2006.01)
*B01J 19/00* (2006.01)
*B01J 8/00* (2006.01)

(52) U.S. Cl.
USPC ............ 422/202; 422/129; 422/187; 422/198

(58) Field of Classification Search
CPC ......... A01N 59/00; A01N 37/16; B01J 19/00;
B01J 19/24; B01J 19/0013; B01J 8/00;
B01J 8/067; B01J 7/00; B01J 3/384; B01J
2219/00094; B01J 2208/005; B01J 2203/0233;
B01J 2523/00; B82Y 40/00; C07C 15/08;
C07C 31/08; C07C 201/08; B01D 3/009
USPC .................................. 422/129, 187, 198, 202
See application file for complete search history.

(56) References Cited

U.S. PATENT DOCUMENTS

| | | | | |
|---|---|---|---|---|
| 3,635,279 | A | * | 1/1972 | Matsunaga et al. ........... 164/501 |
| 3,754,398 | A | * | 8/1973 | Mattavi ........................... 60/298 |
| 4,041,318 | A | * | 8/1977 | Poulsen ..................... 250/459.1 |
| 4,045,211 | A | | 8/1977 | Powers |
| 4,632,587 | A | * | 12/1986 | Vollhardt ...................... 422/202 |
| 4,741,881 | A | * | 5/1988 | Fauske .......................... 422/112 |
| 4,899,812 | A | | 2/1990 | Altoz |
| 4,981,102 | A | | 1/1991 | Gautreaux et al. |
| 5,137,012 | A | | 8/1992 | Crossman, Jr. |
| 5,140,821 | A | * | 8/1992 | Fauske ............................ 62/45.1 |
| 6,195,382 | B1 | * | 2/2001 | Wagner ......................... 373/146 |
| 6,442,950 | B1 | | 9/2002 | Tung |
| 6,580,895 | B2 | * | 6/2003 | Hirst et al. ..................... 399/330 |
| 7,216,496 | B2 | * | 5/2007 | Yamazaki ........................ 62/185 |
| 2002/0129930 | A1 | * | 9/2002 | Nougier et al. ............... 165/157 |
| 2004/0088921 | A1 | * | 5/2004 | Kleinpass et al. .......... 48/197 R |
| 2005/0145242 | A1 | | 7/2005 | Romeu |

* cited by examiner

*Primary Examiner* — Walter D Griffin
*Assistant Examiner* — Natasha Young
(74) *Attorney, Agent, or Firm* — Fish & Tsang, LLP

(57) ABSTRACT

Devices and methods are presented in which heat transfer from the surface of a high-temperature exothermic reaction mass is removed while largely maintaining the temperature of the mass at a desired level by allowing heat to radiate from the surface of the reaction mass to a first absorber that forms part of a reactor vessel, from which the heat is then removed using a second absorber.

15 Claims, 1 Drawing Sheet

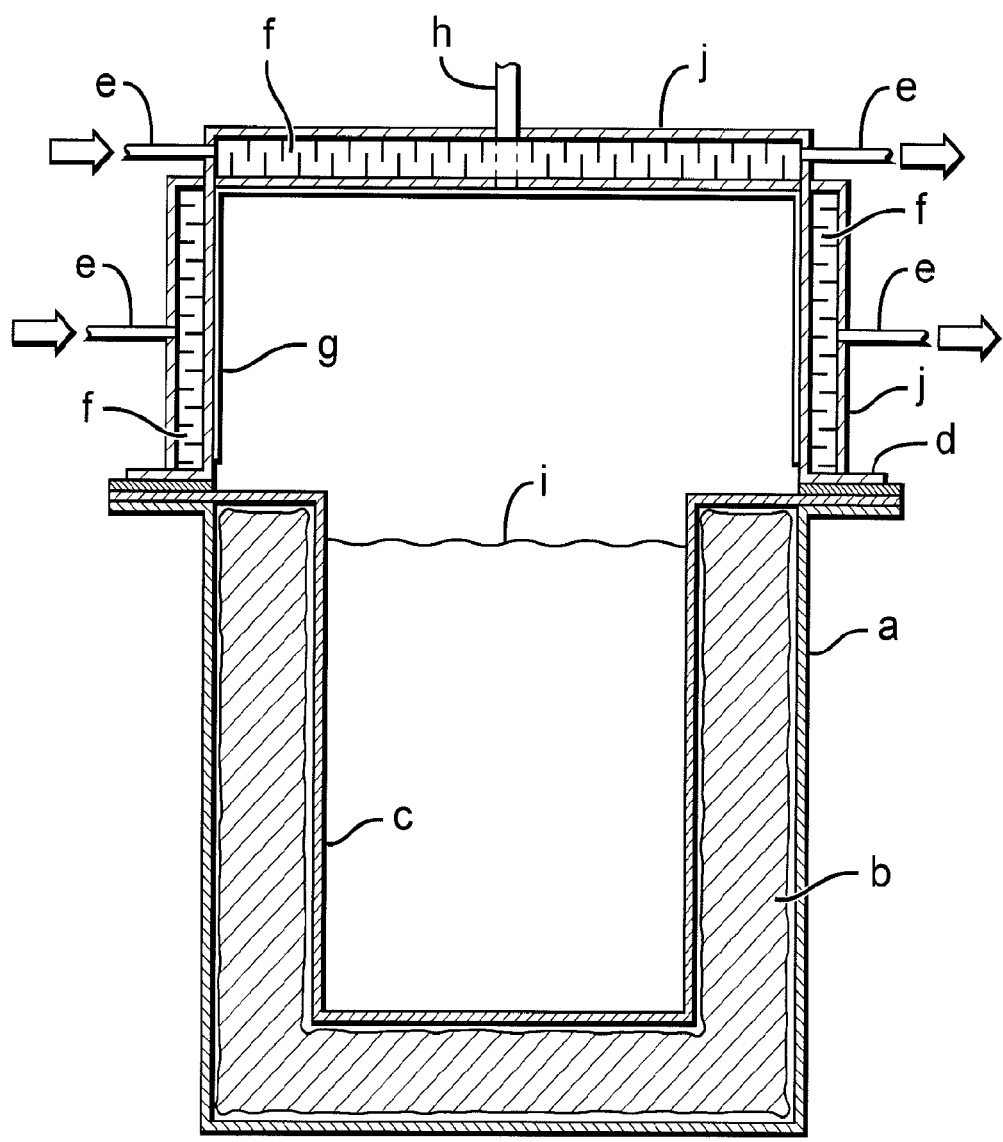

DEVICES AND METHODS OF HEAT REMOVAL FROM EXOTHERMIC HIGH TEMPERATURE REACTION PROCESSES

This application claims priority to our U.S. provisional application with the Ser. No. 61/090,709, filed Aug. 21, 2008.

FIELD OF THE INVENTION

The field of the invention is methods and devices for heat transfer from various high-temperature reaction processes, and especially highly exothermic reactions with concomitant dust evolution.

BACKGROUND OF THE INVENTION

In most known processes for removal of heat generated by highly exothermic high-temperature reactions, heat is transferred from the reaction mass via conduction through the reaction mass to the inner walls of a reactor vessel, and is then further conducted through the vessel walls, and finally convected from the exterior vessel walls to an external heat transfer medium such as air or water. Most typically, where the medium is water, the medium is often sprayed or routed through coils that are coupled to the exterior walls. On the other hand, where the medium is air, the exterior wall of the reactor may be fitted with cooling fins, and air may be forced onto or across the fins to promote heat transfer.

Unfortunately, currently known configurations and methods are generally limited by two competing and mutually exclusive objectives. The first objective is to maintain the reaction at a predetermined high temperature, below which the reaction may not perform optimally or even stop, and/or below which the reaction may leave unacceptable levels of unreacted materials. However, that high temperature cannot exceed a temperature above which the reactor vessel walls or liner material installed within the reactor vessel will fail due to excessive temperatures. Thus, the second objective is to maintain the reactor vessel walls at acceptable low temperatures to avoid reaction vessel failure. To overcome potential heat damage, insulating material can be installed as a liner inside the containment vessel. However, such mitigation would necessarily and significantly reduce the removal of the heat of reaction through the vessel walls using the above described conductive/convective processes.

It should therefore be appreciated that failure to remove heat from a highly exothermic reaction system may result in excessive internal temperatures and subsequent failure of the reactor vessel walls or liner material. Conversely, and absent insulation, heat transfer can be accomplished, but it is then difficult (if not even impossible) to maintain desired high reaction temperatures. Furthermore, in configurations and methods where heat transfer to the vessel walls is allowed, the vessel wall temperature may readily exceed maximum tolerable limits set by safe design where highly exothermic reactions are performed. To avoid vessel wall failure in such instances, extraordinary safeguards must be employed, which tend to promote a heat transfer that often lowers the reaction temperature below the desired high temperature. Moreover, these difficulties may be even further compounded by dust formation in the course of an exothermic reaction.

Therefore, there is a substantial need for improved devices and methods for heat removal from high temperature exothermic reaction systems, and especially reactions that evolve significant quantities of dust particles.

SUMMARY OF THE INVENTION

The present invention is directed to various devices and methods for reactor vessels in which an exothermic high temperature reaction mass is contained, wherein those devices and methods not only avoid the drawbacks from heretofore known systems but allow realization of previously conflicting advantages.

In one aspect of the inventive subject matter, a method of heat transfer from the surface of a high-temperature exothermic reaction mass that is disposed in a reactor vessel includes a step of allowing the heat to radiate from the surface of the reaction mass to a first absorber that forms part of a reactor vessel, wherein at least one other surface of the reactor vessel is thermally insulated. The so absorbed radiated heat is then removed from the first absorber using a second absorber. It should be especially noted that where the reaction involves formation of dust particles, it is further contemplated that the heat may also radiate from the surface of the reaction mass to the first absorber via turbulent black body particles.

Most typically, the first absorber comprises a metal and the second absorber includes a heat transfer fluid, and in at least some embodiments, the first absorber will have a surface that is substantially parallel to the surface of the reaction mass. For example, the first absorber can be configured as a lid, and the second absorber may flow through a conduit that is coupled to or formed in the lid. Suitable lids may be configured to have an absorptive side wall that is substantially perpendicular to the surface of the reaction mass, and/or the absorptive side wall may be curved or comprises a dome shape. It is also generally preferred that the first absorber includes a layer that improves absorption of radiant heat from the surface of the reaction mass, and/or that the one or more remaining surfaces of the reactor vessel are insulated by a refractory layer.

Therefore, and viewed from a different perspective, a high-temperature exothermic reaction mass reactor vessel may include a plurality of thermally insulated walls that are configured to contain a high-temperature exothermic reaction mass having a reaction surface. The reactor vessel will further include a first absorber coupled to the plurality of walls, wherein the first absorber is configured and positioned to allow absorption of radiant heat from the surface of the reaction mass. A second absorber is then thermally coupled to the first absorber, wherein the second absorber is configured and positioned to absorb heat from the first absorber.

In especially preferred aspects, the first absorber is configured as a lid, the second absorber flows through a conduit that is coupled to or formed in the lid, and the first absorber is substantially parallel to the surface of the reaction mass. Where desired, the first absorber further comprises a layer that improves absorption of radiant heat from the surface of the reaction mass.

Alternatively, and especially where the exothermic reaction involves formation of dust particles, a high-temperature exothermic reaction mass reactor vessel will include a plurality of thermally insulated walls that are configured to contain a high-temperature exothermic reaction mass having a reaction surface. A first absorber is then coupled to the plurality of walls and configured and positioned to allow absorption of radiant heat from a plurality of black body particles suspended in a space above the surface of the reaction mass. In such embodiments, the plurality of black body particles have a sufficiently small size to allow heating of the particles by the surface of the reaction mass, and the surface of the reaction mass has a temperature sufficient to support mechanical convective movement of the particles. A second absorber is then thermally coupled to the first absorber, wherein the second absorber is configured and positioned to absorb heat from the first absorber.

Most preferably, the first absorber is configured as a lid, the second absorber flows through a conduit that is coupled to or formed in the lid, and the lid is configured to have an absorptive side wall that is curved or that has a dome shape. As before, the first absorber may further comprise a layer that improves absorption of radiant heat from the surface of the reaction mass.

Various objects, features, aspects and advantages of the present invention will become more apparent from the following detailed description of preferred embodiments of the invention.

BRIEF DESCRIPTION OF THE DRAWING

FIG. 1 is an exemplary illustration of a reactor vessel according to the inventive subject matter.

DETAILED DESCRIPTION

The present invention is directed to improved reactor vessels for high-temperature exothermic reactions and methods therefor in which the reaction mass is contained in an insulated area that allows for convective transfer of heat from the reaction surface to a first absorber, and that allows for conductive transfer of heat from the first absorber to a second absorber. Thus, it should be noted that contemplated devices and methods not only allow for protection of the vessel via an insulated area while maintaining a desirably high reaction temperature, but also allow heat removal in a controlled manner via combined convective and conductive heat transfer to a cooling medium to so prevent overheating of the reaction mass and/or reactor vessel.

Therefore, in particularly preferred aspects, the reaction temperature of an exothermic reaction is maintained at a desired high set point as heat is removed via radiation from the surface of the reaction mass (that is not in direct contact with an inside surface of the vessel) and the radiant heat is then absorbed into at least one inside surface of the reactor (e.g., the reactor lid). At the same time, the wall temperatures of the remaining surfaces of the reactor vessel is kept low by use of various insulation materials (e.g., by installation of an insulating layer onto selected reactor inner wall surfaces). It is further preferred that the reaction surface temperature and/or the temperature of the reactor liner and wall are monitored and controlled using manners well known in the art.

In one exemplary aspect of the inventive subject matter, a reactor is configured to allow removal of heat from a high temperature reaction surface of an exothermic reaction mass via radiation and subsequent absorption of the radiated heat into a heat transfer surface that is thermally coupled to a cooling medium. For example, the exothermic reaction may be the formation of certain pure metal from precursors in the presence of (typically molten) other metals. Therefore, the surface of the reaction mass may have a temperature of between 500° C. and 1,500° C., and more typically between 800° C. and 1,200° C. In such and other contemplated devices, heat is allowed to radiate from the reaction surface and is then absorbed in a first absorber (which is most preferably a surface parallel to the reaction surface as elaborated in more detail below). For example, such first absorber may be the underside of a lid that is positioned above and parallel to the reaction surface. The so absorbed heat is then conducted through the absorber to the upper (opposite, or other) side of the first absorber, from which the heat is then further conducted into a heat transfer medium (e.g., cooling water or cooling oil). The heat transfer medium is typically contained in a space formed by the first absorber and a second surface (typically parallel to the first absorber surface) and walls surrounding and connecting both parallel surfaces. The heat is then removed from the reactor via removal of the transfer medium at a predetermined rate (which is typically a function of at least the reaction temperature and heat capacity of the medium).

It should be especially appreciated that in such configurations and methods, heat is prevented from leaving the reaction medium via conduction through the reaction mass contained in the reaction vessel to and across the walls of the reaction vessel by a liner (or otherwise insulating structure) in the reaction vessel. Most typically, such liner comprises one or more layers where at least one such layer is an insulating material and where other layers may be any other type of materials (e.g., further insulator, structural layer, etc.). There are numerous known insulating and/or refractory materials known in the art, and all of such materials are deemed suitable for use herein. Therefore, contemplated devices and methods combine numerous advantages by (1) allowing heat to radiate from the reaction surface, (2) insulating non-conducting surfaces to protect the reaction vessel, and (3) radiated heat to be transferred across a first (typically static) absorber into a second (typically fluid) absorber.

In especially preferred aspects of the inventive subject matter, the first absorber has a first surface that is substantially parallel to the reaction surface in the reaction vessel. However, it should, be appreciated that numerous alternative geometries are also deemed suitable for use herein. It is still further preferred that at least a portion of the first absorber (most typically the underside of the first absorber that faces the surface of the reaction mass) is coated with a substrate that improves absorption of the radiant heat (e.g., dark colored substrate, carbon, soot, silicon carbide, etc.) or other refractory material. Such layer is most preferably sufficiently thin (e.g., less than 1 mm, more typically less than 0.1 mm) to promote heat transfer at a desirable rate.

While not limiting to the inventive subject matter, it is generally preferred that the first absorber comprises a metal, metal alloy, or ceramic material that is most preferably resistant to temperatures within the reaction vessel. Where the first absorber is configured as a lid or other cover, it is generally contemplated that the first absorber does not directly contact the remainder of the reaction vessel, but that an insulating material is disposed between the under-side of the first absorber and the seating surface where it joins the wall of the reactor (e.g., between the flanges joining the reactor side-wall with the lid). Such indirect coupling will advantageously reduce conduction of heat and provide a thermal seal between the reactor vessel and lid.

Heat is removed from the first absorber via a second absorber that is most preferably a heat transfer fluid. Depending on the particular design parameters, it should be appreciated that the heat transfer fluid may contact the first absorber in numerous manners. For example, the heat transfer fluid may be provided as a jacket to the first absorber, may be guided through and/or across channels in or on the first absorber. However, most preferably the heat transfer fluid is confined to a space that is formed between the upper surface of the first absorber and a second surface that is typically parallel to the upper surface. Where desired, one or more fins may be installed on the upper surface of the first absorber to contact the heat transfer fluid (to promote good heat transfer). For example, the fins may be arranged such as to create a tortuous path and turbulence for the heat transfer fluid. Alternatively, the heat transfer medium may also be channeled trough cooling coils that are attached to the upper surface of the first absorber.

In still further contemplated devices and methods, it is preferred that the first absorber (and where desirable also associated structures to contain the heat transfer medium) includes one or more conduits through which reactants consumed in the reaction vessel may be added to the reactor. For example, such conduits may include nozzles or other through openings (with side walls) in the reactor lid. As noted above, it is generally preferred that the remaining inside surfaces of the reactor vessel are thermally insulated from the high temperature reactor contents (to so protect and allow for lower temperature reactor vessel walls). Among other suitable options, the remaining reactor vessel walls may be insulated by a liner (e.g., comprising one or more layers, where at least one layer is an insulator or otherwise refractory material).

In a still further particularly preferred aspect, devices and methods are contemplated where the space above the reaction surface comprises material (e.g., dust particles) that will interfere with radiative transmission of heat to the first absorber. For example, where the exothermic reaction in the reactor is the formation of a pure metal from precursor materials, dust formation is typically inevitable upon introduction of the reactants into the reactor. Moreover, additional quantities of dust may be produced in the form of fine grained product metal particles and particles from reaction by-products.

One of ordinary skill in the art would readily conclude that evolving dust in the vapor space above the reaction mass would block radiative heat transfer and so substantially reduce, if not even eliminate the otherwise necessary heat transfer. However, and contrary to common belief, the inventor now discovered that turbulence (typically by, but not necessarily limited to convective turbulence) in the space above the surface of the reaction mass is sufficient to overcome blocking of radiative heat transfer. Even more remarkably, turbulence modifies the mode of radiative heat transfer and as such opens new avenues to even further improved heat removal from a reactor.

More particularly, and without dust formation, radiation is emitted from a hot surface and will travel directly to the nearest preferably parallel surface (typically the flat underside of the reactor lid), which then absorbs the heat via an absorptive (e.g., black) coating. Thus, conventional wisdom (based on a standard model of radiative transmission between two infinite parallel planes) would therefore demand that in the presence of dust, transmission to the underside of the lid is reduced or even entirely prevented. While direct transmission to the surface parallel to the surface of the reaction mass is indeed reduced in the presence of dust, it should be appreciated that each dust particle can act as an individual absorptive black body. Since the emissivity of an individual dust particle approaches a value of about 1 (as dust is gray in color), the particle's temperature will rise until it is radiating an amount of energy identical to that which it receives. However, and in stark contrast to the "infinite parallel planes" model, each particle will radiate in all directions. Thus, if the walls of the reactor are insulated (to prevent external heat loss), the inward and outward radiation from each dust particle will continue until the radiation from the particles finds a way out of the system.

Assuming that the vapor space of the reaction system (i.e., the space above the reaction surface) is moderately turbulent, each particle will move throughout the vapor and ultimately be at some point in close proximity to the lid. At that point, radiation emitted by the particle will be absorbed by the lid. Consequently, the thermal energy will exit the system and the particle will cool and so be ready for new energy to be absorbed. This new energy to be absorbed will either come from the reaction surface, or much more likely from another dust particle. Of course, it should be noted that by a chain of such absorptions and re-emissions the energy radiating from the particle in proximity to the lid will ultimately be provided by the reaction surface.

Therefore, it should be especially appreciated that the presence of dust may improve heat transfer from the reaction surface in a multi-directional mode, and with that significantly increase energy removal from the system. In the case of the parallel planes model, only the under-surface of the lid efficiently absorbs energy for removal from the system (as it is cooled from above with a cooling medium). However, where the heat transfer surface in the lid is increased, significantly larger amounts of heat can be removed from the system where dust is present due to the distinctly different mode of energy transfer: Heat is radiatively absorbed by the dust, then convectively transported from the "hot" dust particle to a black-body surface (another dust particle), and lastly re-radiated from the other dust particle to the absorptive surface of the reactor. As dust particles radiate in horizontal dimensions as well as in vertical dimensions, it should be recognized that radiative energy can also be removed from the side walls forming the lid as well as from the under-side of the lid (both of which are externally cooled). Consequently, the potential absorptive area (black-body area) for a given size reactor can be readily increased by increasing the interior black-body area. Viewed from a different perspective, numerous devices and methods with improved heat transfer can now be implemented that make effective use of a combined mechanical convective and radiative heat transport mechanism.

One such configuration is exemplarily depicted in FIG. 1, in which a reactor vessel has an exterior vessel shell (a). Such shell may be manufactured from numerous materials as the shell is expected to be exposed to only moderate temperatures (typically well below 500° C.). The interior surfaces of the shell are preferably insulated by refractory or otherwise insulating material as shown as layer (b). Of course, numerous insulating materials are deemed suitable for use herein (e.g., poured refractory materials, ceramic materials, mineral wool, etc.) so long as such materials insulate the shell (a) from the heat in the reaction pot (c). Moreover, it should be appreciated that the space in which the insulating layer (b) is disposed can be pressurized (e.g., using an inert gas) to a pressure that counterbalances a pressure in the reaction mass and head space above the mass where the reaction produces a pressure or is performed under pressure. The reaction pot (c) is typically formed from high-temperature resistant metal or metal alloy. It is generally preferred that the reaction pot is flanged such that the flange is sandwiched between the outer shell flange of shell (a) and the lid flange of lid shell (j). It should be especially noted that the reaction pot not only contains the reaction mass, but also presents a barrier against the reaction mass intruding into the insulating layer and further prevents contamination of the reaction mass with material from the insulating layer. Insulating gasket (d) is positioned between (a) and (j) to minimize heat flux between the lid shell and the shell. The lid shell will typically include one or more inlet and/or outlet nozzles (e) for circulation of the cooling medium (e.g., hot oil) within the inner plenums (f), which are preferably baffled or otherwise modified to create turbulent flow of the heat transfer fluid and to increase heat transfer area.

Layer (g) schematically illustrates a black substrate (typically a thin absorptive layer) on inner surface of the lid, which includes the side walls and the upper surface to so significantly increase the receiving surface for radiated heat. The lid further includes one or more inlet nozzles (h) (only one is shown) for reactant feeds. As the temperature on top of the lid is typically relatively low (e.g., less than 200° C.), a separate plenum on top of the lid (for gas and reactant entrance) may be omitted. The reaction surface (i) is schematically depicted as a wavy line and it should be noted that this surface is not static but may move up as the reaction proceeds (in the case of batch reaction). It should be further noted that such configuration may be readily modified, for example, with a bottom withdrawal mechanism to enable semi-continuous or continuous operation. Furthermore, the walls of the lid may be tapered inward and down such that dust will not accumulate on horizontal surfaces.

In still further contemplated embodiments, it should be recognized that while exemplary FIG. 1 depicts the lid as having flat inner surfaces, numerous other geometries are also deemed suitable herein. Indeed, as the mode of heat transfer is not radiative transmission between two parallel planes but a combined mechanical convective and radiative heat transport, the surface geometry of the inner surfaces are preferably chosen such as to enlarge the surface area (relative to a flat and planar lid proximal and parallel to the reaction surface). Consequently, it is contemplated that the top closure (lid shell (j)) of the reactor may have curved or otherwise non-planar surfaces, and will preferably further include side walls that increase the distance between the flange and surface that is positioned above the reaction surface. For example, especially suitable top closures may be configured as an extended cylinder, a dome (optionally coupled to side walls to so form a round-top cylinder), and a square or rectangular column, each or which may have protrusions to increase surface area and/or turbulence in the vapor space above the reaction surface. Additionally, or alternatively, one or more mechanisms may be provided in the vapor space above the reaction surface to increase turbulence, especially where the vapor space is relatively large. Such mechanisms may include passive mechanisms (e.g., vanes, fins, etc.) or active mechanisms (e.g., impellers, turbines, etc.) or even externally added mechanisms (e.g., injection of inert gas [argon, etc]). Furthermore, and where desirable, additional quantities of dust compatible with the reaction may be added to increase heat transfer.

As in the devices and methods presented earlier, it should be noted that in configurations and methods presented herein heat is prevented from leaving the reaction medium via conduction through the reaction mass contained in the reaction vessel to the walls of the reaction vessel by a liner (or otherwise insulating structure) in the reaction vessel. Thus, heat is allowed to leave the system only via the combined mechanical convective and radiative heat transport. Therefore, contemplated devices and methods combine numerous advantages by (1) allowing heat to radiate from the reaction surface, (2) insulating non-conducting surfaces to protect the reaction vessel, and (3) radiated heat to be transferred via a plurality of absorbing and radiating particles across a first (typically static) absorber into a second (typically fluid) absorber.

Regardless of the specific manner of heat transfer, it should be appreciated that since the exothermic reaction in many instances will primarily occur at the liquid surface (e.g., in reactions where a metal is formed from precursors), contemplated devices and methods allow for a heat transfer system that scales up directly with the reaction area as the first absorber surface can be directly and proportionally scaled up with an enlarged reaction surface area without the need for further elaborate heat transfer mechanisms.

Thus, specific embodiments and applications of heat transfer from exothermic high temperature processes have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of heat transfer from a surface of a high-temperature exothermic reaction mass that is disposed in a reactor vessel, comprising steps of:
    allowing heat to radiate from the surface of the reaction mass to a first absorber that forms part of a reactor vessel, wherein at least one other surface of the reactor vessel is thermally insulated;
    removing the absorbed radiate heat from the first absorber using a second absorber; and
    wherein the first absorber is configured as a lid, and wherein the second absorber flows through a conduit that is coupled to or formed in the lid.

2. The method of claim I wherein the step of allowing heat to radiate further comprises allowing heat to radiate from the surface of the reaction mass to the first absorber via a plurality of turbulent black body particles.

3. The method of claim I or claim 2 wherein the first absorber comprises a metal and wherein the second absorber comprises a heat transfer fluid.

4. The method of claim 1 wherein the first absorber has a surface that is substantially parallel to the surface of the reaction mass.

5. The method of claim 2 wherein the lid is configured to have an absorptive side wall that is substantially perpendicular to the surface of the reaction mass.

6. The method of claim 2 wherein the lid is configured to have an absorptive side wall that is curved or comprises a dome shape.

7. The method of claim it or claim 2 wherein the first absorber further comprises a layer that improves absorption of radiant heat from the surface of the reaction mass.

8. The method of claim 1 wherein the at least one other surface of the reactor vessel is insulated by a refractory layer.

9. A high-temperature reaction mass reactor vessel, the vessel comprising;
    a plurality of thermally insulated walls at least partially enclosing a reaction pot that is configured to contain a high-temperature exothermic reaction mass having a reaction surface;
    a first absorber coupled to the plurality of walls, the first absorber being configured and positioned to allow absorption of radiant heat from the surface of the reaction mass; and
    a second absorber thermally coupled to the first absorber, wherein the second absorber is configured and positioned to conductively absorb heat from the first absorber, wherein the first absorber is configured as a lid, and wherein the second absorber flows through a conduit that is coupled to or formed in the lid.

10. The reactor vessel of claim 9 wherein the first absorber is substantially parallel to the surface of the reaction mass, and optionally further comprises a layer that improves absorption of radiant heat from the surface of the reaction mass.

11. The reactor vessel of claim 9 wherein the reaction pot is positioned in the vessel such that contact between the reaction mass and an insulation material of the thermally insulated walls is prevented, and optionally wherein the vessel is configured to allow adjusting of pressure in a space in which the insulation material is disposed to the pressure in the reaction pot.

12. A high-temperature reaction mass reactor vessel, the vessel comprising:
- a plurality of thermally insulated walls at least partially enclosing a reaction pot that is configured to contain a high-temperature exothermic reaction mass having a reaction surface;
- a first absorber coupled to the plurality of walls, the first absorber being configured and positioned to allow absorption of radiant heat from a plurality of black body particles suspended in a space above the surface of the reaction mass;
- wherein the plurality of black body particles have a sufficiently small size to allow heating of the particles by the surface of the reaction mass, and wherein the surface of the reaction mass has a temperature sufficient to support mechanical convective movement of the particles; and
- a second absorber thermally coupled to the first absorber, wherein the second absorber is configured and positioned to conductively absorb heat from the first absorber.

13. The reactor vessel of claim 12 wherein the first absorber is configured as a lid, and wherein the second absorber flows through a conduit that is coupled to or formed in the lid, and wherein the first absorber optionally further comprises a layer that improves absorption of radiant heat from the surface of the reaction mass.

14. The reactor vessel of claim 12 wherein the lid is configured to have an absorptive side wall that is curved or wherein the lid comprises a dome shape.

15. The reactor vessel of claim 12 wherein the reaction pot is positioned in the vessel such that contact between the reaction mass and an insulation material of the thermally insulated walls is prevented, and optionally wherein the vessel is configured to allow adjusting of pressure in a space in which the insulation material is disposed to the pressure in the reaction pot.

* * * * *